US006934267B1

(12) United States Patent
Mannerstråle

(10) Patent No.: US 6,934,267 B1
(45) Date of Patent: Aug. 23, 2005

(54) TIME SLOT ALLOCATION CONTROL BASED ON TEMPERATURE IN A RADIO TRANSCEIVER

(75) Inventor: Jacob Mannerstråle, Eslöv (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 683 days.

(21) Appl. No.: 09/686,621

(22) Filed: Oct. 12, 2000

(30) Foreign Application Priority Data

Oct. 13, 1999 (GB) .................................. 9924255

(51) Int. Cl.[7] .............................................. H04B 1/36
(52) U.S. Cl. ................................................. 370/311
(58) Field of Search ......................... 455/127.1, 343.1, 455/343.2, 343.3, 343.4, 343.5, 572, 573, 455/574; 320/134, 135, 136; 370/311, 345, 370/347, 348

(56) References Cited

U.S. PATENT DOCUMENTS

| 5,248,929 | A |   | 9/1993  | Burke     |         |
|-----------|---|---|---------|-----------|---------|
| 5,475,741 | A | * | 12/1995 | Davis et al. | 379/102.06 |
| 5,519,886 | A |   | 5/1996  | Gilbert et al. |    |
| 5,524,275 | A |   | 6/1996  | Lindell   |         |
| 5,590,414 | A |   | 12/1996 | Marui et al. |      |
| 5,774,784 | A |   | 6/1998  | Ohno      |         |
| 5,870,685 | A |   | 2/1999  | Flynn     |         |
| 5,883,493 | A | * | 3/1999  | Koenck    | 320/114 |
| 6,044,069 | A | * | 3/2000  | Wan       | 370/311 |
| RE36,973  | E | * | 11/2000 | Shigemori | 455/231 |
| 6,169,884 | B1| * | 1/2001  | Funk      | 455/522 |
| 6,490,447 | B2| * | 12/2002 | Biedermann et al. | 455/426.1 |

FOREIGN PATENT DOCUMENTS

| EP | 394074 A2    | 10/1990 |
| EP | 407367 A2    | 1/1991  |
| EP | 800 282 A2 A2 | 10/1997 |
| EP | 843421A2 A2  | 5/1998  |
| GB | 2311910 A    | 10/1997 |
| GB | 2320993 A    | 7/1998  |
| GB | 2324686 A    | 10/1998 |
| GB | 2328588 A    | 2/1999  |
| GB | 2339113 A    | 1/2000  |
| JP | 8070273      | 3/1996  |
| JP | 9-326749     | 12/1997 |
| JP | 10-145865    | 5/1998  |
| JP | 11055176     | 2/1999  |
| WO | 99/52218 A1  | 10/1999 |
| WO | 00/31990 A2  | 6/2000  |
| WO | 00/45189 A2  | 8/2000  |

OTHER PUBLICATIONS

"Mobile Station-Base Station Compatibility Standard for Wideband Spread Spectrum Cellular Systems"; TIA/EIA Standard, Mar. 1999, pp. 6-46 through 6-47.*
Copy of International Search Report dated Oct. 13, 1999.
Copy of UK Search Report dated Sep. 28, 2000.
Copy of UK Search Report (no date).

* cited by examiner

*Primary Examiner*—Chi Pham
*Assistant Examiner*—Derrick W. Ferris
(74) *Attorney, Agent, or Firm*—Potomac Patent Group PLLC

(57) ABSTRACT

A radio transmitter such as a mobile telephone is operating in a TDMA system. The number of slots which can be allocated for transmissions from said device is adjusted based on the temperature of the casing of the device, the remaining battery life thereof or the mode of operation thereof.

31 Claims, 3 Drawing Sheets

TIMESLOT

US 6,934,267 B1

TIME SLOT ALLOCATION CONTROL BASED ON TEMPERATURE IN A RADIO TRANSCEIVER

TECHNICAL FIELD OF THE INVENTION

This invention relates to a radio transceiver, in particular for use in a system in which data can be transmitted at variable rates. More specifically, the invention relates to a method of controlling a rate of data transmission, in order to maintain a desired transceiver operating parameter within a desired range.

BACKGROUND OF THE INVENTION

In many existing or proposed digital radiocommunication systems, for example TDMA systems such as GSM/EDGE, CDMA systems such as those defined in IS95, or wideband CDMA (W-CDMA) systems, there exists the possibility for a mobile terminal to transmit data at a variable rate. In general, it is desirable for the terminal to transmit at the highest data rate which is possible, given the available system capacity.

JP-A-9-326749 discloses a mobile communications device, for use in a TDMA system, in which packet data can be transmitted either continuously, that is in all three time slots of the TDMA system, or intermittently, that is in only one or two of the three TDMA slots. The device switches between continuous and intermittent mode in dependence on a temperature detected by a temperature sensor located in the vicinity of the power module of the device, which contains the amplifying stage.

However, this requires the use of a separate temperature sensor, which of course increases the number of components in the device.

Moreover, it is concerned only with the temperature of the electronic components of the device, which may not be the most important factor as far as the user is concerned.

SUMMARY OF THE INVENTION

The present invention relates to a device, and a method of control thereof, in which a rate at which data is transmitted is determined by a sensed temperature which has a direct effect on the comfort of the user. For example, the sensed temperature may be the temperature of the casing of the device.

Further, in accordance with the invention, the temperature sensor may have a dual function within the device. For example, the temperature sensor may also detect the temperature of a display within the device. As a further example, the temperature sensor may also detect the temperature of a crystal oscillator within the device.

The present invention also relates to a device, and a method of control thereof, in which a rate at which data is transmitted is determined by the remaining capacity of a battery thereof. This can be achieved by directly detecting the remaining battery capacity. Alternatively, the remaining battery capacity can be estimated on the basis of a measure of past usage of the device. For example, the past usage can be determined as a function of the number of timeslots in which the device has transmitted data, or the number of timeslots in which the device has received data, or the sum of these two. Alternatively, the current consumption of the terminal can be used as a measure of the past usage, and hence of the remaining battery capacity.

If the remaining battery capacity is low, the rate at which data can be transmitted can be reduced.

The present invention also relates to a device, and a method of control thereof, in which a rate at which data is transmitted is determined by the mode of operation thereof. For example, a mobile communications device may be operable in a hands free mode, or with a loudspeaker, and in such modes the rate at which data is transmitted can be correspondingly altered.

Preferably, in all aspects of the invention, the rate at which data is transmitted is determined by the number of slots in a TDMA or similar frame structure which are allocated to such transmissions. Thus, the invention applied to all systems with a TDMA access method, including for example D-AMPS, GSM, PDC, and developments thereof.

The decision that the rate of data transmission is to be reduced is advantageously taken within the mobile device itself. The device then preferably signals this to a base station or other similar controller.

DETAILED DESCRIPTION OF THE PREFERRED EMBODIMENTS

Figure 1:
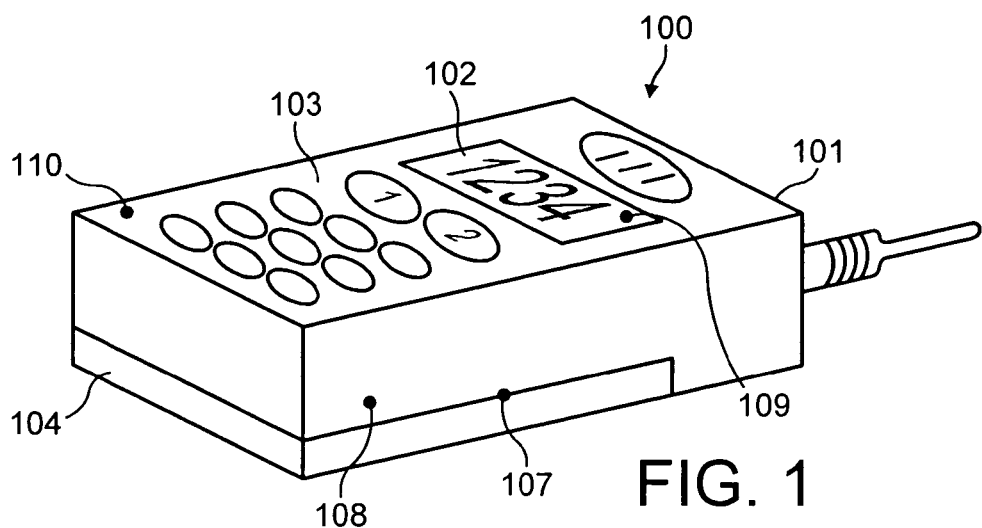
FIG. 1 shows a mobile phone in accordance with an aspect of the invention.

FIG. 1 shows a mobile phone 100 which is of generally conventional form, except as described further herein. As is well known, the phone 100 has a casing 101, which contains a display, for example a liquid crystal display, 102 and a keypad 103. The invention is applicable to any device, and in particular to any portable radiocommunications device.

As will be described further below, the phone is controlled on the basis of a measured temperature thereof. The phone 100 is provided with one or more temperature sensors, for example a temperature sensor 108 for detecting a temperature of the casing 101, where it is typically held by a user, or a temperature sensor 109 for detecting a temperature of of the display 102, or a temperature sensor 110 for detecting a temperature of of the keypad 103, since the display and keypad are typically adjacent to the user's face in use of the device. A temperature sensor 107 could also be provided which detects the temperature of the battery 104. Thus, the device may include at least one sensor which detects a temperature of a part of the device which has a direct effect on the comfort of the user, for example because it is contacted by the user.

Figure 2:
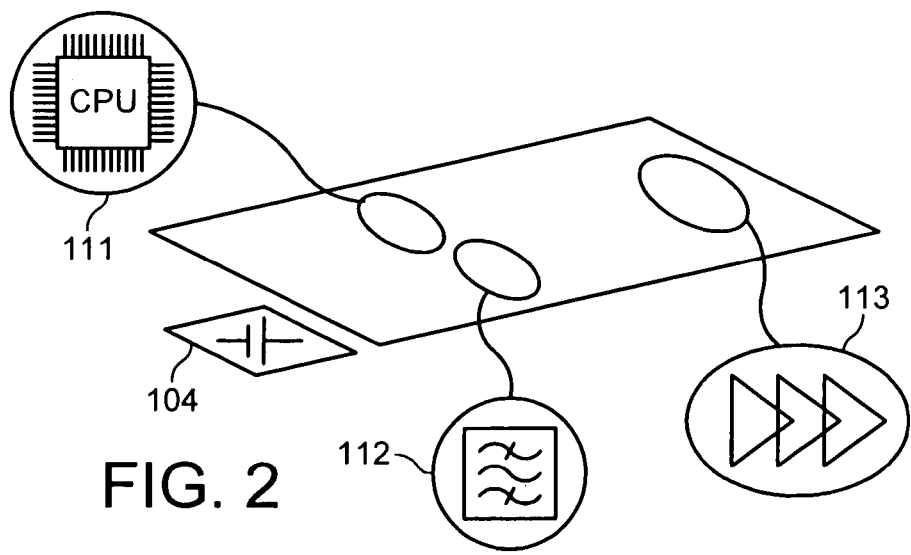
FIG. 2 is a schematic representation of internal components of the phone of FIG. 1.

FIG. 2 is a schematic representation of a part of the electronic circuitry within the phone 100. For illustrative purposes only, the circuitry includes a processor 111, as well as other integrated circuits, filter 112, and power amplifier 113, and a connection to the battery 104. In addition to, or as an alternative to, the temperature sensors mentioned in connection with FIG. 1, the phone 100 may be provided with one or more temperature sensors which detect the temperature of any of these components.

Advantageously, the temperature sensor which is used may have a dual function. For example, the display 109 may include a temperature sensor which is also used to control the contrast thereof. Alternatively, the device may include a temperature sensor which is used to detect the temperature of a crystal oscillator within the electronic circuitry, in order to compensate for variations in the performance thereof.

Figure 3:
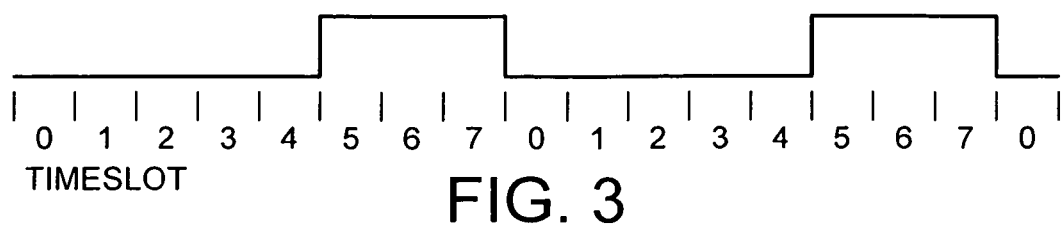
FIG. 3 shows first transmissions from a device in accordance with the invention.

FIG. 3 illustrates a TDMA structure in which the device is operated. For example, the device may be a GSM phone, or any other terminal operating in a TDMA system, or other system in which data is transmitted in timeslots. In the case of GSM, each frame is divided into eight timeslots, numbered 0–7. In the situation illustrated in FIG. 3, the device is active in three slots out of eight, namely slots 5, 6 and 7.

Figure 4:
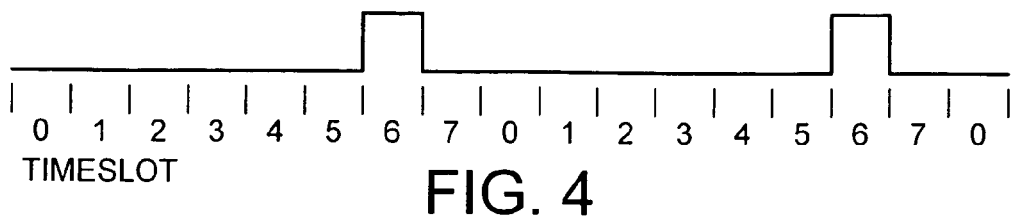
FIG. 4 shows second transmissions from a device in accordance with the invention.

By contrast, in the situation illustrated in FIG. 4, the device is active in only one slot out of eight, namely slot 6.

To illustrate the difference which this will make to the power which must be dissipated by the device, some data relating to a GSM phone, operated with a 3V power supply will be used. Such a device typically dissipates 0.3 W when not transmitting. When the device is transmitting at full power, the transmitter uses a peak current of 1.5 A. With a voltage of 3V, this gives a power of 4.5 W. A power of approximately 2 W is transmitted through the antenna, leaving 2.5 W of heat to be dissipated.

When the phone is transmitting for three slots out of eight, the mean power dissipated is therefore:

$$0.3 + 2.5 \times 3/8 = 1.24 \text{ W}$$

By contrast, when the phone is transmitting for one slot out of eight, the mean power dissipated is:

$$0.3 + 2.5 \times 1/8 = 0.61 \text{ W}$$

If a high power is dissipated as heat for long periods, the temperature of the phone can increase uncomfortably for the user.

The dissipated power can of course be reduced by decreasing the power of transmitted signals. However, it is often essential to transmit signals at relatively high power levels, in order to achieve an acceptable signal-to-noise ratio or carrier-interference ratio, which will inevitably mean that a certain level of power will need to be dissipated.

Therefore, when a network (for example via a base station) instructs a mobile terminal to operate at a particular increased transmission power, it may at the same time instruct it to operate in a reduced number of time slots for transmission and/or reception. By this means, the total power dissipated in the device can be controlled, and its temperature maintained within acceptable limits.

Similarly, if it is determined that the terminal should operate at a reduced power, it may operate in an increased number of time slots for transmission and/or reception.

Figure 5:
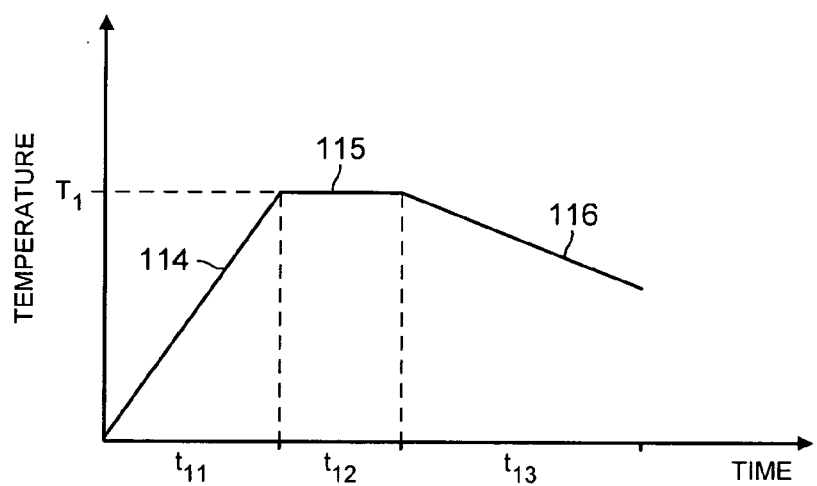
FIG. 5 is a plot of temperature against time for a device in accordance with the invention.

FIG. 5 shows a time history of the temperature of the device, for example as measured by a temperature sensor located on or close to the casing of the device. During time $t_{11}$, the device is transmitting during, say, three slots out of eight in each frame, and the temperature of the device is increasing (line 114). When the temperature reaches a predetermined threshold $T_1$, the device automatically stops transmitting data at this high rate, and reduces its transmission rate such that during time $t_{12}$ (line 115) it transmits in, say, two slots out of every eight slots within a frame. During this time, the device generates heat at a rate which it can dissipate, and the temperature stabilises. During time $t_{13}$ (line 116) it further reduces its transmission rate and transmits in, say, just one slot out of every eight slots within a frame. The temperature of the device then falls as the device is generating heat at a rate lower than that which it can dissipate.

Figure 6:
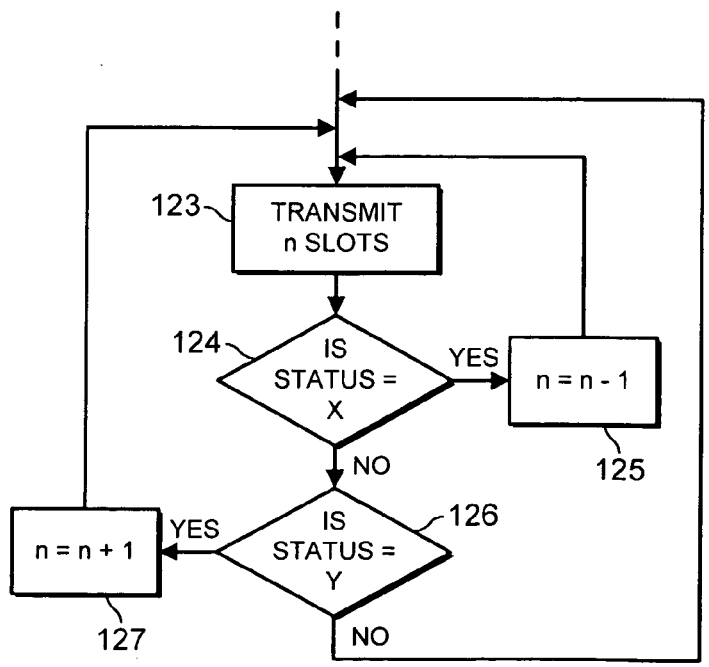
FIG. 6 is a flow chart illustrating a method in accordance with the invention.

FIG. 6 is a flow chart showing a method of controlling operation of the mobile device. The process begins at step 123, in which the device is transmitting in a certain number of slots, n, in each frame. In general, it will be desirable for the device to transmit in as many slots as the system permits it to, based on system capacity etc. The number, n, may therefore be a limit determined by the phone itself, based on temperature or some other intrinsic criterion. In step 124 it is determined whether a first particular criterion is met. For example, it is determined whether the sensed temperature of the device is at or above the threshold temperature in the case described with reference to FIG. 5. If the criterion is met, the process passes to step 125, and the number, n, is reduced by one. Thus, for example, if the device is originally transmitting in three slots in each frame, after step 125 it transmits in two slots in each frame.

If, in step 124, the criterion is not met, the process passes to step 126. In step 126, it is determined whether a second criterion is met. For example, it may be determined whether the sensed temperature of the device is below a second threshold temperature in the case described with reference to FIG. 5. If the criterion is met, that is, the device has now cooled sufficiently, the process passes to step 127, and the number, n, is increased by one. Thus, for example, if the device is originally transmitting in three slots in each frame, after step 127 it transmits in four slots in each frame.

If, in step 126, the criterion is not met, the process returns to step 123.

As described above, the maximum number of slots, in which the mobile device can transmit, is determined by the mobile device on the basis of intrinsic criteria. However, since the slots are in fact allocated to the device by the system, in preferred aspects of the invention the terminal or mobile device sends a message (for example, in the case of a GSM or other cellular phone, to a base station) in an appropriate protocol, requesting that the number of allocated slots be reduced.

As mentioned above, the number of slots, in which the device transmits, can be adjusted to control the temperature of a part of the device. However, other factors could be controlled. As one alternative, the remaining battery capacity could be a factor. For example, it may be preferable for the user to make a longer call, transmitting data at a relatively low rate, than to transmit data at a relatively high rate, if that causes the battery to fail after a short time. Means may be-provided to allow the user to input his wishes, for example the length of call he wishes to make. If the remaining battery capacity is sufficient to allow the desired length of call only if the number of used slots is low, then the number of slots can be controlled appropriately.

Figure 7:
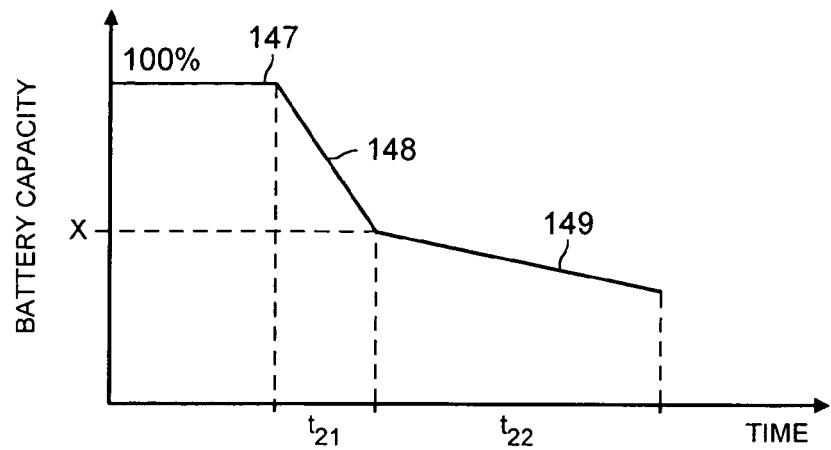
FIG. 7 is a plot of battery capacity against time for a device in accordance with the invention.

FIG. 7 shows a time history of the battery capacity of the device, for example as measured by a conventional method, such as measuring the power supplied by the battery, and the temperature thereof. During an initial period, (line 147), the device is in standby mode, and the battery capacity remains close to 100%. Then, during time $t_{21}$, the device is transmitting during, say, three slots out of eight in each frame, and the battery capacity is falling quickly (line 148). When the temperature reaches a predetermined threshold X, the device automatically stops transmitting data at this high rate, and reduces its transmission rate such that, during time $t_{22}$ (line 149) it transmits in, say, just one slot out of every eight slots within a frame. In this way, the battery life, that is the time until the remaining capacity reaches zero, is extended.

As an alternative to a direct measurement of the temperature of the device, or the remaining battery life, it is possible to estimate these factors indirectly.

Figure 8:
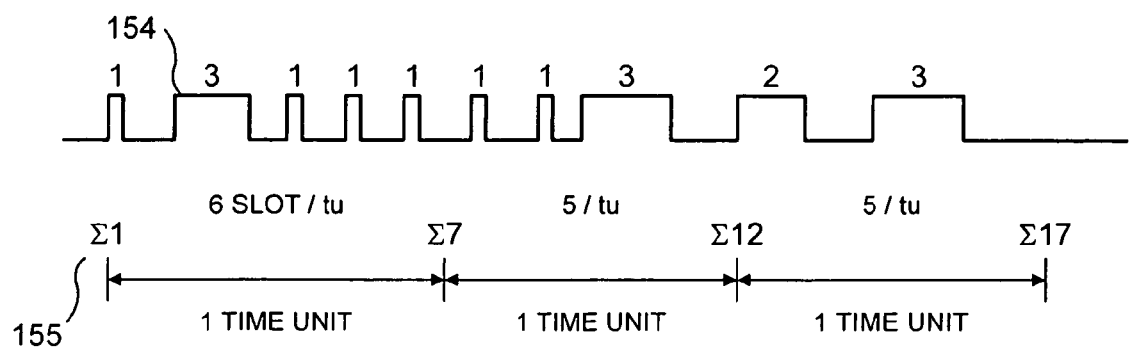
FIG. 8 shows third transmissions from a device in accordance with the invention.

FIG. 8 shows, schematically, (line 154) the slots in which a device has transmitted data over a time period, which is arbitrarily divided into time units (tu). One possibility is to count the total number of transmission timeslots 155, as indicated in FIG. 8 by the running total value 1, 7, 12, 17, etc. The total number of transmission timeslots will give an acceptable estimate of the remaining battery life. An alternative is to count the number of transmission timeslots 156 in each time unit, that is, in FIG. 8, 6 slots/tu, 5 slots/tu, 5 slots/tu, etc. This will provide an acceptable estimate of the temperature of the device.

A further alternative is to provide a current meter which detects the current supplied to the device, or to important components thereof such as the transmitter section, receiver section, and/or baseband section. The detected current can be integrated over time, and the total will give an estimate of the temperature of the device, since it will be related to the heat dissipated therein.

Thus, the number of slots in which the device can transmit can be controlled on the basis of an estimated temperature or battery capacity obtained in these ways.

The number of slots in which the device can transmit can also be controlled on the basis of other factors, such as the mode of operation of the device. For example, the device may be a phone which can be operated in a hands free mode with a loudspeaker. In that case, the device may use more power, and so it may be advantageous to place an upper limit on the number of timeslots in which the device can transmit, so that battery life is not further shortened undesirably. Means may then be provided to detect the hands free operation. For example, a proximity switch may be provided to detect when the device is close to a user's head.

As a further example, the device may be a phone which can be operated in a portable handheld mode or from a mains power supply. In that case, when the device is operated from the mains supply, the battery capacity and temperature of the device may be less of a concern. Alternatively, if the device can be operated in a hands free mode without a loudspeaker, for example for data transfer or with an earpiece, the heating of the device may also be of less concern, since it will not be next to the user's head. In these situations, it may be advantageous to place a higher upper limit on the number of timeslots in which the device can transmit in that mode, and a lower upper limit when the device is handheld.

Means may then be provided to detect the hands free operation. For example, means may be provided to detect when an earpiece is inserted, or a proximity switch may be provided to detect when the device is close to a user's head, and may reduce the number of timeslots used in that situation.

Further, in an RF simplex system, the device can not transmit and receive at the same time. For example, this is true in a system with TDMA access method with multislot capability, such as GPRS. In this situation, it may be advantageous to place an upper limit on the number of timeslots in which the device can transmit data, so that more timeslots are available to receive data, or vice versa.

There are therefore described systems which allow control of the transmissions of a radiocommunications system, based on intrinsic criteria of the device, in order to allow specific performance targets to be met. Although the different aspects of the invention have been described primarily with reference to controlling the rate at which data can be transmitted from a mobile device, any of the same criteria can be used to determine the rate at which data can be received in a mobile device, and the invention is also applicable to other radiocommunication devices. Thus, the term radio transceiver is used herein to mean any device which can transmit or receive signals.

What is claimed is:

1. A method of operating a radio transceiver operating in a radiocommunication system defining a plurality of time slots, the method comprising:
monitoring a temperature external to the transceiver which has a direct effect on the comfort of a user of the transceiver; and
controlling a number of time slots allocated for transmissions from said transceiver in response to the monitored temperature.

2. A method of operating a radio transceiver operating in a radiocommunication system defining a plurality of time slots, the method comprising:
monitoring a temperature external to the transceiver which has a direct effect on the comfort of a user of the transceiver; and
controlling a number of time slots allocated for receiving transmissions in said transmitter in response to the monitored temperature.

3. A method as claimed in claim 1, wherein the transceiver forms part of a mobile communications device, and the temperature is a temperature of a casing of the device.

4. A method as claimed in claim 1, wherein the transceiver forms part of a mobile communications device, and the temperature is a temperature of a display of the device.

5. A method as claimed in claim 1, wherein the transceiver forms part of a mobile battery-powered communications device, and the temperature is a temperature of the battery of the device.

6. A method as claimed in claim 1, wherein the number of allocated slots is controlled by sending a message to the radiocommunication system.

7. A radiocommunications device comprising a radio transceiver operable in a radiocommunication system defining a plurality of time slots, the device comprising:
a temperature sensor for monitoring a temperature external to the transceiver which has a direct effect on the comfort of a user of the device; and
a controller for controlling a number of time slots allocated for transmissions from said transceiver in response to the monitored temperature.

8. A radiocommunications device comprising a radio transceiver operable in a radiocommunication system defining a plurality of time slots, the device comprising:
a temperature sensor for monitoring a temperature external to the transceiver which has a direct effect on the comfort of a user of the device; and
a controller for controlling a number of time slots allocated for receiving transmissions in said transceiver in response to the monitored temperature.

9. A method of operating a radio transceiver operating in a radiocommunication system defining a plurality of time slots, the method comprising:
monitoring a temperature within the transceiver;
controlling the internal operation of the transceiver in response to the measured temperature; and also controlling a number of time slots allocated for transmissions from said transceiver in response to the same monitored temperature.

10. A method of operating a radio transceiver operating in a radiocommunication system defining a plurality of time slots, the method comprising:
monitoring a temperature within the transceiver;
controlling the Internal operation of the transceiver in response to the measured temperature; and
also controlling a number of time slots allocated for receiving transmissions in said transceiver in response to the same monitored temperature.

11. A method as claimed in claim 9, wherein the transceiver forms part of a mobile communications device, and the temperature is a temperature of a crystal oscillator within the device, and is used to compensate for variations in the performance thereof.

12. A method as claimed in claim 9, wherein the transceiver forms part of a mobile communications device, and the temperature is a temperature of a display of the device, and is used to control said display.

13. A radiocommunications device comprising a radio transceiver operable in a radiocommunication system defining a plurality of time slots, the device comprising:
a single temperature sensor for monitoring a temperature within the device; and
at least one controller for controlling the internal operation of the device and a number of time slots allocated for transmissions from said transceiver in response to the same monitored temperature.

14. A radiocommunications device comprising a radio transceiver operable in a radiocommunication system defining a plurality of time slots, the device comprising:
a single temperature sensor for monitoring a temperature within the device; and
at least one controller for controlling the internal operation of the device and a number of time slots allocated for receiving transmissions in said transceiver in response to the same monitored temperature.

15. A method of operating a radio transceiver operating in a radiocommunication system defining a plurality of tine slots, the method comprising:
monitoring a battery capacity of the transceiver; and
controlling a number of time slots allocated for transmissions from said transceiver in response to the monitored battery capacity.

16. A method of operating a radio transceiver operating in a radiocommunication system defining a plurality of time slots, the method comprising:
monitoring a battery capacity of the transceiver; and
controlling a number of time slots allocated for receiving transmissions in said transceiver in response to the monitored battery capacity.

17. A method as claimed in claim 15, wherein the battery capacity is measured directly.

18. A method as claimed in claim 15, wherein the battery capacity is estimated indirectly.

19. A method as claimed in claim 18, wherein the battery capacity is estimated on the basis of a measure of past use.

20. A method as claimed in claim 18, wherein the battery capacity is estimated on the basis of a measured temperature thereof.

21. A method as claimed in claim 19, wherein the measure of past use is the number of time slots in which the transceiver has transmit data.

22. A method as claimed in claim 19, wherein the measure of past use is the past current consumption of at least a part of the transceiver.

23. A radiocommunications device comprising a radio transceiver operable in a radiocommunication system defining a plurality of time slots, the device comprising:
means for determining a battery capacity of the device; and
at least one controller for controlling a number of time slots allocated for transmissions from said transceiver in response to the determined battery capacity.

24. A radiocommunications device comprising a radio transceiver operable in a radiocommunication system defining a plurality of time slots, the device comprising:
means for determining a battery capacity of the device; and
at least one controller for controlling a number of time slots allocated for receiving transmissions in said transceiver in response to the determined battery capacity.

25. The method of claim 1, wherein the transceiver forms part of a mobile communications device, and the temperature is a temperature of a keypad of the device.

26. The method of claim 2, wherein the transceiver forms part of mobile communications device, and the temperature is a temperature of a casing of the transceiver.

27. The method of claim 2, wherein the transceiver forms part of a mobile communications device, and the temperature is a temperature of at least one of a display and a keypad of the device.

28. The device of claim 7, wherein the temperature sensor monitors a temperature of a casing of the device.

29. The device of claim 7, wherein the temperature sensor monitors a temperature of at least one of a display and a keypad of the device.

30. The device of claim 8, wherein the temperature sensor monitors a temperature of at least one of a display and a keypad of the device.

31. The device of claim 8, wherein the temperature sensor monitors a temperature of at least one of a display and a keypad of the device.

* * * * *